(12) United States Patent
Duan et al.

(10) Patent No.: US 11,473,717 B2
(45) Date of Patent: Oct. 18, 2022

(54) ULTRA-LONG THERMALLY INSULATED PIPELINE AND FORMING METHOD THEREOF

(71) Applicant: SHINDA (TANGSHAN) CREATIVE OIL & GAS EQUIPMENT CO., LTD., Hebei (CN)

(72) Inventors: Jianliang Duan, Hebei (CN); Jian Dong, Hebei (CN); Shujun Zhang, Hebei (CN); Yueqing Lin, Hebei (CN); Fengshou Shangguan, Hebei (CN); Xiang Liu, Hebei (CN)

(73) Assignee: SHINDA (TANGSHAN) CREATIVE OIL & GAS EQUIPMENT CO., LTD., Tangshan (CN)

( * ) Notice: Subject to any disclaimer, the term of this patent is extended or adjusted under 35 U.S.C. 154(b) by 157 days.

(21) Appl. No.: 15/931,053

(22) Filed: May 13, 2020

(65) Prior Publication Data
US 2021/0190253 A1    Jun. 24, 2021

(30) Foreign Application Priority Data
Dec. 20, 2019 (CN) .......................... 201911331889.0

(51) Int. Cl.
*F16L 59/02* (2006.01)
*F16L 59/12* (2006.01)
(Continued)

(52) U.S. Cl.
CPC .............. *F16L 59/028* (2013.01); *B32B 1/08* (2013.01); *B32B 5/02* (2013.01); *B32B 15/18* (2013.01);
(Continued)

(58) Field of Classification Search
CPC ....... F16L 59/028; F16L 59/02; F16L 59/065; F16L 59/12; F16L 59/029; F16L 59/123;
(Continued)

(56) References Cited

U.S. PATENT DOCUMENTS 6,000,438 A * 12/1999 Ohm ...................... F16L 59/143
138/155
6,116,290 A * 9/2000 Ohm ...................... F16L 59/143
138/148
(Continued)

*Primary Examiner* — Craig M Schneider
*Assistant Examiner* — David R Deal
(74) *Attorney, Agent, or Firm* — Innovation Capital Law Group, LLP; Vic Lin

(57) ABSTRACT

The present invention provides an ultra-long thermally insulated pipeline, which includes a working steel pipe and an outer sleeve steel pipe sleeving the working steel pipe, where an annular vacuum cavity is formed between the working steel pipe and the outer sleeve steel pipe; two ends of the outer sleeve steel pipe are tightened; and the tightened parts of the outer sleeve steel pipe are sealed with an outer wall of the working steel pipe through a plurality of sealing rings. The ultra-long thermally insulated pipeline further includes a spiral ring supporting frame which is disposed outside the working steel pipe and is in contact with a wall of the working steel pipe. The spiral ring supporting frame is made of a phase change material The present invention further provides a forming method of an ultra-long thermally insulated pipeline.

17 Claims, 4 Drawing Sheets

(51) Int. Cl.
  *C09K 5/06* (2006.01)
  *F16L 9/02* (2006.01)
  *B32B 15/18* (2006.01)
  *F16L 59/14* (2006.01)
  *F16L 59/147* (2006.01)
  *F16L 59/125* (2006.01)
  *F16L 59/065* (2006.01)
  *B32B 1/08* (2006.01)
  *B32B 15/20* (2006.01)
  *B32B 5/02* (2006.01)

(52) U.S. Cl.
  CPC .............. *B32B 15/20* (2013.01); *C09K 5/063* (2013.01); *F16L 9/02* (2013.01); *F16L 59/065* (2013.01); *F16L 59/12* (2013.01); *B32B 2262/101* (2013.01); *B32B 2264/1023* (2020.08); *B32B 2264/12* (2013.01); *B32B 2597/00* (2013.01); *F16L 59/029* (2013.01); *F16L 59/123* (2013.01); *F16L 59/125* (2013.01); *F16L 59/143* (2013.01); *F16L 59/147* (2013.01)

(58) Field of Classification Search
  CPC ..... F16L 59/125; F16L 59/143; F16L 59/147; B32B 1/08; B32B 5/02; B32B 15/18; B32B 15/20; B32B 2264/1023; B32B 2262/101; B32B 264/12; B32B 2597/00; C09K 5/063
  See application file for complete search history.

(56) References Cited

U.S. PATENT DOCUMENTS

| | | | |
|---|---|---|---|
| 6,978,825 B1* | 12/2005 | Baylot | E21B 17/01 165/45 |
| 2004/0030016 A1* | 2/2004 | Chomard | E21B 17/01 524/394 |
| 2005/0241717 A1* | 11/2005 | Hallot | F16L 59/143 138/108 |
| 2010/0126618 A1* | 5/2010 | D'Souza | C04B 26/04 428/313.9 |
| 2012/0261019 A1* | 10/2012 | Glejbol | F16L 11/083 138/138 |
| 2017/0059080 A1* | 3/2017 | Zheng | B32B 7/00 |

* cited by examiner

ULTRA-LONG THERMALLY INSULATED PIPELINE AND FORMING METHOD THEREOF

TECHNICAL FIELD

The present invention relates to the field of thermally insulated pipelines, and in particular to, an ultra-long thermally insulated pipeline and a forming method thereof.

BACKGROUND

At present, most areas use coal-fired heating in winter, and heat loss inevitably occurs in the transport process, thus causing a sharp increase in coal consumption. With the continuous reduction of energy resources, there is an urgent need to reduce energy consumption.

Geothermal energy is the thermal energy stored in the earth's interior. It has two different sources, one from outside the earth and the other from inside the earth. From the earth's surface inward, the influence of solar radiation gradually weakens. To a certain depth, this influence disappears, and the temperature does not change throughout the year, that is, it reaches the so-called "normal temperature layer". From the normal temperature layer down, the ground temperature gradually increases due to the influence of the internal heat of the earth. This kind of thermal energy from the earth's interior is called "internal heat". The increase of ground temperature every 100 m or 1 km deeper underground is called the geothermal heating rate. In terms of development and utilization, geothermal energy has more development potential than other renewable energy, and is receiving increasing attention all over the world.

The geothermal energy is currently mainly used in the following aspects.

Geothermal power generation is the most direct way to utilize geothermal energy. The principle of geothermal power generation is the same as that of thermal power generation, which is to convert heat energy of steam into mechanical energy in a steam turbine and then drive a generator to generate electricity. The difference is that geothermal power generation does not need a huge boiler as required for thermal power generation, and does not need to consume fuel. The energy it uses is geothermal energy. The process of geothermal power generation is the process of converting underground heat energy into mechanical energy first and then converting the mechanical energy into electric energy. At present, heat carriers that can be used by geothermal power stations are mainly underground natural steam and water.

Geothermal using is direct use of geothermal energy for heating, heat supply and hot water supply, which is the geothermal utilization mode second only to the geothermal power generation.

Another geothermal utilization mode is agricultural utilization of geothermal energy. Irrigating farmland with geothermal water with an appropriate temperature can make crops grow early and increase yield. Using geothermal water to raise fish can accelerate the fattening of fish and increase the yield of fish at a water temperature of 28° C. Geothermal energy is used to build greenhouses, raise rice seedlings, grow vegetables and raise flowers. Geothermal energy is used to heat a biogas digester to increase the output of biogas.

Another geothermal utilization mode is industrial utilization of geothermal energy. Geothermal water contains many precious rare elements, radioactive elements, rare gases and compounds, such as bromine, iodine, boron, potassium, helium, heavy water and potassium salts, which are indispensable raw materials for national defense industry, atomic energy industry, chemical industry and agriculture.

Another geothermal utilization mode is use of geothermal in medical treatment and tourism. Geothermal water has a high temperature, special chemical composition and gas composition, a small amount of bioactive ions and radioactive substances, etc., and slime is formed in some geothermal areas, which has obvious medical and health care effects on human body.

Geothermal energy has extensive utilization value. In order to make better use of geothermal resources, it is necessary to solve the following problems: low geothermal utilization rate, few exploitable geothermal resources, and high exploitation cost.

Due to limitations of current exploitation technologies, only shallow geothermal energy can be used, and the thermal insulation effect of pipes is poor in the exploitation process, which further reduces the utilization rate of geothermal energy and greatly affects the exploitation and utilization of geothermal energy.

Similarly, in the process of underground oil exploitation, the difficulty of oil exploitation increases due to the poor thermal insulation effect of pipelines. Oil, also known as crude oil, is a brown-black flammable and viscous liquid exploited from deep underground. A freezing point of crude oil is about −50° C. to 35° C. The poor thermal insulation effect of pipelines during the exploitation process easily leads to solidification of crude oil in exploitation pipelines. The solidified crude oil needs to be heated in time to ensure smooth exploitation, thus greatly increasing cost and cycle of oil exploitation. Therefore, a pipeline with a good thermal insulation effect is also needed in the process of oil exploitation.

The patent CN 208090184 U discloses a steel thermally insulated pipe with a steel sleeve, which includes a working steel pipe, a PPR pipe sleeving the working steel pipe and a protective steel pipe sleeving the PPR pipe, where a closed cavity is formed between the working steel pipe and the PPR pipe, a supporting frame for keeping the working steel pipe and the PPR pipe coaxial is disposed between the working steel pipe and the PPR pipe, and a heating element is also arranged on an outer wall of the working steel pipe. The PPR pipe is arranged in the middle of the steel thermally insulated pipe with a steel sleeve, and the heating element is arranged on the outer wall of the working steel pipe for thermal insulation. However, in the steel thermally insulated pipe with a steel sleeve, the PPR pipe easily deforms in a working environment with a higher temperature, resulting in rapid reduction of its thermal insulation effect. Therefore, the steel thermally insulated pipe is not suitable for an underground heat source or oil exploration operation.

SUMMARY

In view of this, the present invention provides an ultra-long thermally insulated pipeline and a forming method thereof. The ultra-long thermally insulated pipeline provided by the present invention has the advantages of a good thermal insulation effect and a long service life, and can be used for the exploitation and development of underground heat source resources and oil resources.

The present invention provides an ultra-long thermally insulated pipeline, including a working steel pipe and an outer sleeve steel pipe sleeving the working steel pipe, where an annular vacuum cavity is formed between the working steel pipe and the outer sleeve steel pipe; two ends of the outer sleeve steel pipe are tightened; and the tightened parts of the outer sleeve steel pipe are sealed with an outer wall of the working steel pipe through a plurality of sealing rings, where the ultra-long thermally insulated pipeline further includes:

a spiral ring supporting frame which is disposed outside the working steel pipe and is in contact with a wall of the working steel pipe, the spiral ring supporting frame is made of a phase change material, and the phase change material includes:

20-30 parts by weight of paraffin phase change microcapsules, where a capsule core of the paraffin phase change microcapsules is made of paraffin, a capsule wall is made of a polymer of methyl methacrylate and styrene, and a molar ratio of the methyl methacrylate to the styrene is (3-5):1;

50-100 parts by weight of elastomer; and 50-100 parts by weight of binder.

The ultra-long thermally insulated pipeline provided by the present invention adopts the vacuum cavity for thermal insulation of the working steel pipe, and the spiral ring supporting frame is arranged on the outer wall of the working steel pipe. The spiral ring supporting frame is an elastic supporting component made of the phase change material, the elastomer and the binder. On the one hand, the phase change material can store and release heat, so that the thermal insulation effect of the thermally insulated pipeline is improved; and on the other hand, the elastomer and the binder can increase the supporting effect of the spiral ring supporting frame.

In the present invention, the spiral ring supporting frame is disposed outside the working steel pipe and is in contact with a wall of the working steel pipe, and the spiral ring supporting frame is made of a phase change material. The phase change material includes:

20-30 parts by weight of paraffin phase change microcapsules, where a capsule core of the paraffin phase change microcapsules is made of paraffin, a capsule wall is made of a polymer of methyl methacrylate and styrene, and a molar ratio of the methyl methacrylate to the styrene is (3-5):1;

50-100 parts by weight of elastomer; and 50-100 parts by weight of binder.

The paraffin phase change microcapsules have the effect of heat storage and heat release. In the present invention, a capsule core of the paraffin phase change microcapsules is made of paraffin, a capsule wall is made of a polymer of methyl methacrylate and styrene, and a molar ratio of the methyl methacrylate to the styrene is (3-5):1. The present invention has no special limitation on the source of the paraffin phase change microcapsules, and the paraffin phase change microcapsules may be prepared according to methods well known to those skilled in the art or purchased on the market. In the present invention, the phase change material has good heat resistance and a high-temperature phase change heat absorption temperature of about 100-300° C., and the phase change material can be used in the fields of geothermal or underground oil exploitation and the like.

In the phase change material, the elastomer functions to increase the elasticity of the spiral ring supporting frame and protect performances of the thermally insulated pipeline under impact; and the binder functions to increase the cohesiveness between the spiral ring supporting frame and the working steel pipe so that the phase change material can play its due role. In the present invention, no special limitation is imposed on the selection of the elastomer and the binder, as long as the use requirement for the ultra-long thermally insulated pipeline can be met. For example, the elastomer may be selected from TPE, TPU, etc. The binder may be selected from epoxy resin, polyester, etc.

In an embodiment of the present invention, the ultra-long thermally insulated pipeline further includes an inorganic thermal insulation material layer disposed outside the working steel pipe, where the inorganic thermal insulation material layer is compounded with the spiral ring supporting frame. That is, the inorganic thermal insulation material layer directly covers the outer wall of the working steel pipe, and the spiral ring supporting frame is disposed in the inorganic thermal insulation material layer.

In the present invention, the inorganic thermal insulation material layer can further prevent heat loss and improve the thermal insulation effect of the thermally insulated pipeline.

In an embodiment of the present invention, the inorganic thermal insulation material layer includes:

20-40 parts by weight of nano alumina ceramic microspheres;

10-20 parts by weight of hollow glass microspheres;

10-20 parts by weight of paraffin phase change microcapsules, where a capsule core of the paraffin phase change microcapsules is made of paraffin, a capsule wall is made of a polymer of methyl methacrylate and styrene, and a molar ratio of the methyl methacrylate to the styrene is (3-5):1;

5-10 parts by weight of reinforced fibers;

50-80 parts by weight of binder; and 10-20 parts by weight of water glass.

Phase change material microspheres are added to the inorganic thermal insulation material layer with the foregoing composition, so that the inorganic thermal insulation material layer has a certain phase change heat absorption and energy storage effect, thus improving the thermal insulation effect. The use of the water glass and the binder can increase the performance of bonding with the working steel pipe, thus prolonging a service life.

In an embodiment, the binder in the inorganic thermal insulation material layer is the same as the binder in the spiral ring supporting frame, thus increasing the compatibility between the inorganic thermal insulation material layer and the spiral ring supporting frame and prolonging the service life of the thermally insulated pipeline.

In an embodiment, the inorganic thermal insulation material layer has a thickness of 3-5 mm.

In an embodiment, the thermally insulated pipeline further includes a plurality of getter blocks disposed on the inorganic thermal insulation material layer. The getter block can absorb gas in the annular vacuum cavity, so that the annular vacuum cavity maintains a higher vacuum degree and the thermal insulation effect is increased.

In an embodiment, the thermally insulated pipeline further includes C-shaped supporting frames wound around the inorganic thermal insulation material layer at intervals, and the C-shaped supporting frames are used for supporting the outer sleeve steel pipe. In an embodiment, the material of the C-shaped supporting frame is selected from stainless steel, carbon steel or titanium alloy, which may be the same material as the working steel pipe or the outer sleeve steel pipe.

In an embodiment, the thermally insulated pipeline further includes an anti-corrosive layer disposed on an outer wall of the outer sleeve steel pipe. In the present invention, no special limitation is imposed on the anti-corrosive layer and the anti-corrosive layer may be formed by coating silicone oil, zinc powder, citric acid, epoxy resin, alumina, diatomite and polyacrylamide. Specifically, the anti-corrosive layer includes 50-60 parts by weight of silicone oil, 20-30 parts by weight of zinc powder, 1-3 parts by weight of citric acid, 5-8 parts by weight of epoxy resin, 1-5 parts by weight of alumina, 1-5 parts by weight of diatomite and 5-10 parts by weight of polyacrylamide. In an embodiment, the anti-corrosive layer includes 55 parts by weight of silicone oil, 25 parts by weight of zinc powder, 2 parts by weight of citric acid, 7 parts by weight of epoxy resin, 3 parts by weight of alumina, 3 parts by weight of diatomite and 8 parts by weight of polyacrylamide. In an embodiment, the anti-corrosive layer has a thickness of 0.1-0.3 mm.

In an embodiment, the annular vacuum cavity of the ultra-long thermally insulated pipeline has a thickness of 3-10 mm, preferably 5-7 mm. In the present invention, when the ultra-long thermally insulated pipeline includes the inorganic thermal insulation material layer, the thickness of the annular vacuum cavity refers to the thickness from the inorganic thermal insulation material layer to the outer sleeve steel pipe; and when the ultra-long thermally insulated pipeline does not include the inorganic thermal insulation material layer, the thickness of the annular vacuum cavity refers to the thickness from the working steel pipe to the outer sleeve steel pipe.

In an embodiment, the thermally insulated pipeline has a length of 1000-8000 m, preferably 3000-8000 m.

In an embodiment, materials of the working steel pipe and the outer sleeve steel pipe of the ultra-long thermally insulated pipeline are independently selected from stainless steel, carbon steel or titanium alloy.

Specifically, the materials of the working steel pipe and the outer sleeve steel pipe may be selected from stainless steel consisting of the following components:

0.019%-0.020% of C, 0.49%-0.50% of Si, 1.25%-1.26% of Mn, 0.022% of P, 0.00005% of S, 5.16%-5.17% of Ni, 22.46%-22.52% of Cr, 0.163%-0.180% of N, 0.003%-0.006% of Cu, 3.07%-3.09% of Mo, and the balance Fe. The stainless steel has a tensile strength greater than or equal to 655 MPa, a yield strength greater than or equal to 620 MPa, an internal yield pressure up to 89.3 MPa, and a collapse pressure up to 74.1 MPa.

Specifically, the materials of the working steel pipe and the outer sleeve steel pipe may be selected from carbon steel consisting of the following components:

0.11% of C, 0.22%-0.24% of Si, 1.44%-1.5% of Mn, 0.008%-0.012% of P, 0.001% of S, 0.58%-0.59% of Cr, 0.14% of Ni, 0.24% of Cu, 0.15%-0.16% of Mo, and the balance Fe. The carbon steel has a tensile strength greater than or equal to 795 MPa, a yield strength greater than or equal to 760 MPa, an internal yield pressure up to 103.4 MPa, and a collapse pressure up to 86.2 MPa.

Specifically, the materials of the working steel pipe and the outer sleeve steel pipe may be selected from TA18 titanium alloy specifically consisting of the following components:

2.0%-3.5% of Al, 1.5%-3.0% of V, 0.25% of Fe, 0.05% of C, 0.05% of N, 0.015% of H, 0.12% of O, and the balance Ti. The titanium steel has a tensile strength greater than or equal to 655 MPa, a yield strength greater than or equal to 620 MPa, an internal yield pressure up to 89.3 MPa, and a collapse pressure up to 74.1 MPa.

In an embodiment, the ultra-long thermally insulated pipeline further includes a glass fiber aluminum foil layer disposed between the inorganic thermal insulation material layer and the outer sleeve steel pipe. The glass fiber aluminum foil layer may be a glass fiber aluminum tape, which can reflect heat on the one hand and fix inorganic thermal insulation materials on the other hand, thus improving the thermal insulation effect.

The present invention further provides a forming method of an ultra-long thermally insulated pipeline, including the following steps:

a): curling and welding a steel plate used for a working steel pipe into a pipe, and performing heat treatment to obtain a working steel pipe;

b): making a phase change material into a spiral ring supporting frame on an outer wall of the working steel pipe, where the phase change material includes:

20-30 parts by weight of paraffin phase change microcapsules, where a capsule core of the paraffin phase change microcapsules is made of paraffin, a capsule wall is made of a polymer of methyl methacrylate and styrene, and a molar ratio of the methyl methacrylate to the styrene is (3-5):1;

50-100 parts by weight of elastomer; and 50-100 parts by weight of binder;

c) curling a steel plate used for an outer sleeve steel pipe; wrapping, on an inner side of the steel plate, the working steel pipe with the outer wall provided with the spiral ring supporting frame in the curling process, welding and sealing the working steel pipe into a sleeve with an annular cavity, and performing heat treatment on the sleeve;

d): placing a plurality of rubber rings at tightened ports of the outer sleeve steel pipe for sealing, vacuumizing the annular cavity, and welding and sealing the ports of the outer sleeve steel pipe; and e): performing heat treatment on the welded and sealed pipeline.

In the present invention, a steel plate used for a working steel pipe is first curled and welded into a pipe, and heat treatment is performed to obtain a working steel pipe, specifically including the following steps of:

first cleaning a surface of a steel plate used for a working steel pipe, specifically, sequentially using a surfactant such as sodium dodecyl benzene sulfonate and clear water to clean the surface many times in an ultrasonic cleaning tank, air-drying the cleaned steel plate, then curling the steel plate, welding the steel plate into a pipe by laser, and then performing heat treatment on the pipe. A preferred process of the heat treatment includes: heating the pipe at 700-1070° C. for 10-40 min, then cooling in a reducing atmosphere (preferably hydrogen), and tempering at 550-720° C. Finally, the working steel pipe having undergone the heat treatment is subjected to sizing and non-destructive testing.

After the working steel pipe is obtained, a phase change material is made into a spiral ring supporting frame on an outer wall of the working steel pipe, specifically including the following steps of:

melting 20-30 parts by weight of paraffin phase change microcapsules, 50-100 parts by weight of elastomer and 50-100 parts by weight of binder and then forming a spiral ring supporting frame on an outer wall of the working steel pipe, and curing the spiral ring supporting frame.

The elastomer and the binder are mixed and melted, the paraffin phase change microcapsules are added and fully and evenly mixed, and then the spiral ring supporting frame is formed on the outer wall of the working steel pipe and cured. Alternatively, the paraffin phase change microcapsules are fully mixed with the melted elastomer and then a spiral ring elastomer is formed, and then the spiral ring elastomer is bonded to the outer wall of the working steel pipe through the binder.

In an embodiment, the paraffin phase change microcapsules are prepared according to the following method including: reacting a capsule core material and a capsule wall material in the presence of water, an emulsifier and an oxidation-reduction initiation system. The emulsifier is selected from OP-10. In the oxidation-reduction initiation system, an oxidant is selected from hydrogen peroxide, and a reducing agent is selected from sodium sulfite.

In the present invention, a steel plate used for an outer sleeve steel pipe is curled; the working steel pipe with the outer wall provided with the spiral ring supporting frame is wrapped on an inner side of the steel plate in the curling process, the steel plate is welded and sealed into a sleeve with an annular cavity, and heat treatment is performed on the sleeve.

Specifically, in the present invention, a surface of a steel plate used for an outer sleeve steel pipe is first cleaned; specifically, a surfactant such as sodium dodecyl benzene sulfonate and clear water are sequentially used to clean the surface many times in an ultrasonic cleaning tank, and the cleaned steel plate is air-dried and then curled; the working steel pipe with the outer wall provided with the spiral ring supporting frame is wrapped on an inner side of the steel plate in the curling process; after the wrapping, the steel plate is welded and sealed into a sleeve by laser, and then heat treatment is performed on the sleeve.

Specifically, a preferred process of the heat treatment includes: heating the pipe at 700-1070° C. for 10-40 min, then cooling in a reducing atmosphere (preferably hydrogen), and tempering at 550-720° C. Finally, the steel pipe having undergone the heat treatment is subjected to sizing and non-destructive testing.

After the heat treatment, a plurality of rubber rings are placed at tightened ports of the outer sleeve steel pipe for sealing, and the annular cavity is vacuumized, so that the annular cavity becomes a vacuum cavity; then the ports of the outer sleeve steel pipe are welded and sealed, and finally the welded and sealed pipeline is subjected to heat treatment. Specifically, the heat treatment is performed at 100-300° C. for 30-60 min, and then the pipeline is cooled to room temperature.

Finally, an outer side of the outer sleeve steel pipe is coated with an anti-corrosive liquid to form an anti-corrosion layer.

Further, when the ultra-long thermally insulated pipeline further includes an inorganic thermal insulation material layer disposed outside the working steel pipe, a preparation method thereof further includes, after step b2):

b3): coating the outer wall of the working steel pipe with an inorganic thermal insulation material, and forming an inorganic thermal insulation material layer after curing, where the inorganic thermal insulation material includes:

20-40 parts by weight of nano alumina ceramic microspheres;

10-20 parts by weight of hollow glass microspheres;

10-20 parts by weight of paraffin phase change microcapsules, where a capsule core of the paraffin phase change microcapsules is made of paraffin, a capsule wall is made of a polymer of methyl methacrylate and styrene, and a molar ratio of the methyl methacrylate to the styrene is (3-5):1;

5-10 parts by weight of reinforced fibers;

50-80 parts by weight of binder; and 10-20 parts by weight of water glass.

In the present invention, first 20-40 parts by weight of nano alumina ceramic microspheres, 10-20 parts by weight of hollow glass microspheres, 10-20 parts by weight of paraffin phase change microcapsules, 5-10 parts by weight of reinforced fibers, 50-80 parts by weight of binder and 10-20 parts by weight of water glass are evenly mixed and then coat the outer wall of the working steel pipe, gaps between spiral ring supporting frames are filled, and an inorganic thermal insulation material layer is formed on the outer wall of the working steel pipe after curing.

The inorganic thermal insulation material layer can completely or partially coat the spiral ring supporting frame.

The ultra-long thermally insulated pipeline provided by the present invention adopts the vacuum cavity for thermal insulation of the working steel pipe, and the spiral ring supporting frame is arranged on the outer wall of the working steel pipe. The spiral ring supporting frame is an elastic supporting component made of the phase change material, the elastomer and the binder. On the one hand, the phase change material can store and release heat, so that the thermal insulation effect of the thermally insulated pipeline is improved; and on the other hand, the elastomer and the binder can increase the supporting effect of the spiral ring supporting frame. Experimental results show that the ultra-long thermally insulated pipeline provided by the present invention has good thermal insulation effect and has no obvious mechanical deformation in the use process.

DETAILED DESCRIPTION

Figure 1:
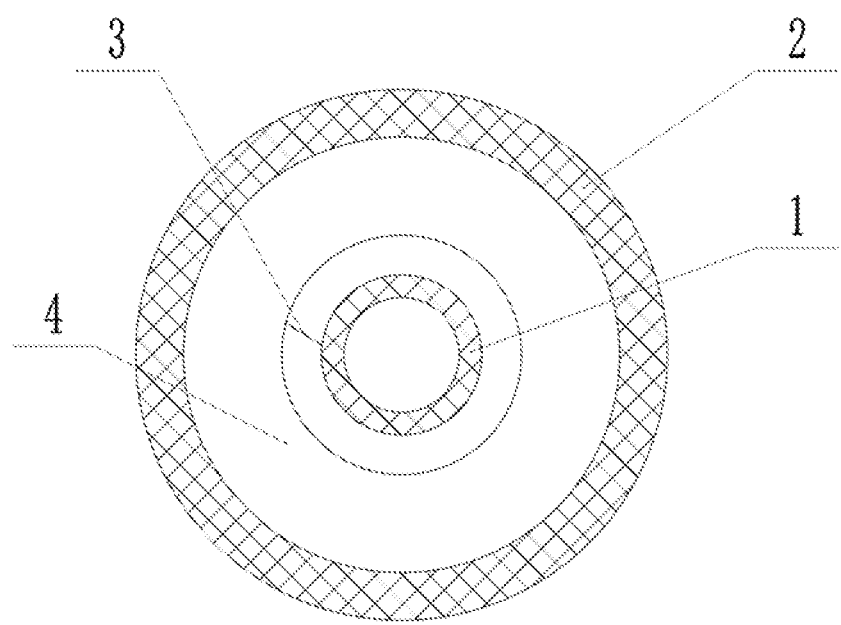
FIG. 1 is a schematic cross-sectional structural diagram of an ultra-long thermally insulated pipeline provided by Embodiment 1 of the present invention.
Figure 3:
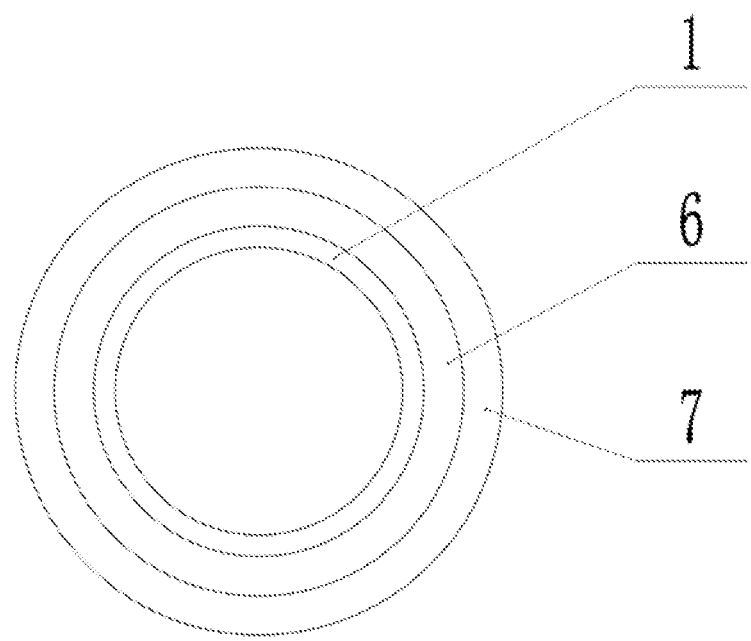
FIG. 3 is a view from one end of a working steel pipe.

As shown in FIG. 1, FIG. 1 is a schematic cross-sectional structural diagram of an ultra-long thermally insulated pipeline provided by Embodiment 1 of the present invention. Provided are a working steel pipe 1, an outer sleeve steel pipe 2, a spiral ring supporting frame 3 in contact with a wall of the working steel pipe 1, and an inorganic thermal insulation material layer 4 compounded with the spiral ring supporting frame 3 and filling between the outer sleeve steel pipe 2 and the working steel pipe 1. As illustrated in FIG. 3, two ends 7 of the outer sleeve steel pipe are tightened; and the tightened parts of the outer sleeve steel pipe are sealed with an outer wall of the working steel pipe through a plurality of sealing rings 6.

Figure 2:
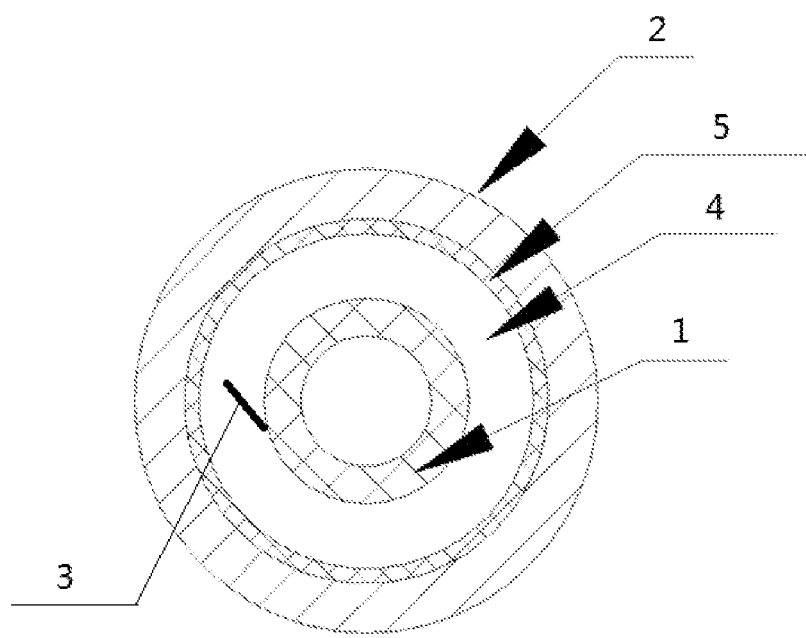
FIG. 2 is a schematic cross-sectional structural diagram of an ultra-long thermally insulated pipeline provided by Embodiment 2 of the present invention.

As shown in FIG. 2, FIG. 2 is a schematic cross-sectional structural diagram of an ultra-long thermally insulated pipeline provided by Embodiment 2 of the present invention. Provided are a working steel pipe 1, an outer sleeve steel pipe 2, a spiral ring supporting frame 3 in contact with a wall of the working steel pipe 1, an inorganic thermal insulation material layer 4 compounded with the spiral ring supporting frame 3 and filling in an interlayer between the outer sleeve steel pipe 2 and the working steel pipe 1, and a glass fiber aluminum foil layer 5 disposed between the inorganic thermal insulation material layer 4 and the outer sleeve steel pipe 2.

In the following embodiments, paraffin phase change microcapsules were prepared according to the following method including:

dissolving an emulsifier in water to form a water phase, where the emulsifier is prepared by compounding Span 80 and Tween 80 at a weight ratio of 1:2; dissolving paraffin wax and a wall material into an oil phase; mixing the water phase with the oil phase, and shearing at a high speed of 6000 rpm for 10 min to form a stable emulsion; adding hydrogen peroxide and sodium bisulfite, and reacting at 25° C. for 5 h to obtain paraffin phase change microcapsules.

Embodiment 1

A steel plate used for a working steel pipe was cleaned in an ultrasonic cleaning tank three times in turn by sodium dodecyl benzene sulfonate and clear water, air-dried and then curled, and welded into a pipe with an inner diameter of 31 mm in one time by laser; then the pipe was heated at 700° C. for 20 min, cooled in a hydrogen atmosphere, and tempered at 550° C. to obtain a working steel pipe, where the working steel pipe was made of stainless steel and its main components were as follows: 0.019% of C, 0.49% of Si, 1.25% of Mn, 0.022% of P, 0.00005% of S, 5.16% of Ni, 22.46% of Cr, 0.163% of N, 0.003% of Cu, 3.07% of Mo, and the balance Fe.

80 parts by weight of elastomer TPU was melted, 20 parts by weight of paraffin phase change microcapsules were added and evenly mixed and then a spiral ring elastomer was formed, and then the spiral ring elastomer was bonded on an outer wall of the working steel pipe by using 100 parts by weight of polyester to form a spiral ring supporting frame.

A steel plate used for an outer sleeve steel pipe was cleaned in an ultrasonic cleaning tank three times in turn by sodium dodecyl benzene sulfonate and clear water, air-dried and then curled, and the working steel pipe with the outer wall provided with the spiral ring supporting frame was wrapped on an inner side of the steel plate in the curling process; after the wrapping, the steel plate was welded and sealed into a sleeve by laser welding, where an annular cavity between the outer wall of the working steel pipe and an inner wall of the outer sleeve steel pipe had a thickness of 7 mm; and the sleeve obtained by welding was heated at 700° C. for 20 min, cooled in a hydrogen atmosphere, and tempered at 550° C. to obtain a working steel pipe, where the working steel pipe was made of TA18 titanium alloy and its main components were as follows: 3.5% of Al, 2.0% of V, 0.25% of Fe, 0.05% of C, 0.05% of N, 0.015% of H, 0.12% of O, and the balance Ti.

A plurality of rubber rings were placed at tightened ports of the outer sleeve steel pipe of the sleeve for sealing, the annular cavity was vacuumized to form an annular vacuum cavity, and finally the ports of the outer sleeve steel pipe were welded and sealed.

Figure 4:
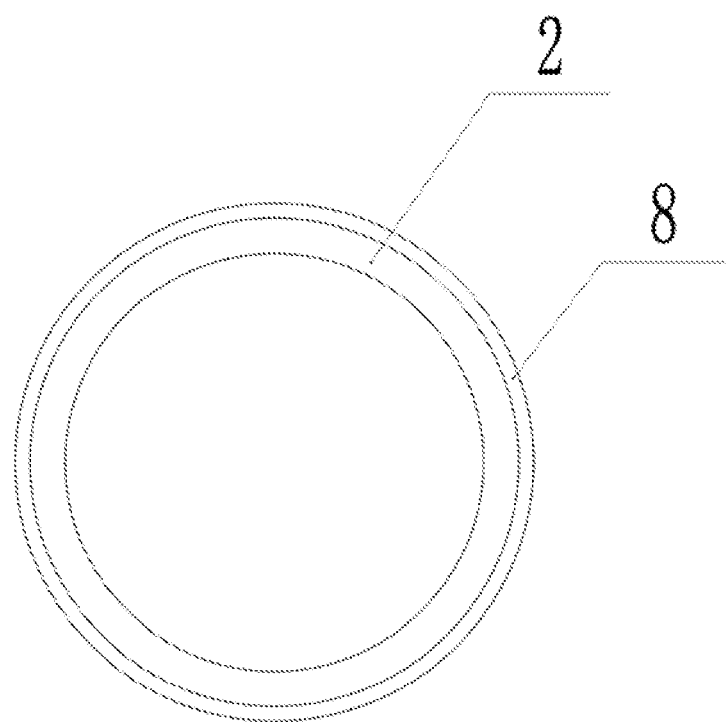
FIG. 4 is a view from one end of an outer sleeve steel pipe.

The obtained sleeve was subjected to heat treatment; specifically, heat treatment was performed at 100° C. for 60 min, then the sleeve was air-cooled to room temperature, and finally the sleeve was coated with an anti-corrosive liquid to form an anti-corrosive layer 8 (see FIG. 4) with a thickness of 0.1 mm, so that a 3000-meter-long thermally insulated pipeline was obtained. The anti-corrosive liquid included 55 parts by weight of silicone oil, 25 parts by weight of zinc powder, 2 parts by weight of citric acid, 7 parts by weight of epoxy resin, 3 parts by weight of alumina, 3 parts by weight of diatomite and 8 parts by weight of polyacrylamide.

A capsule core of the paraffin phase change microcapsules was made of paraffin, and a capsule wall was made of a polymer of methyl methacrylate and styrene at a molar ratio of 3:1.

Embodiment 2

A steel plate used for a working steel pipe was cleaned in an ultrasonic cleaning tank three times in turn by sodium dodecyl benzene sulfonate and clear water, air-dried and then curled, and welded into a pipe with an inner diameter of 31 mm in one time by laser; then the pipe was heated at 700° C. for 20 min, cooled in a hydrogen atmosphere, and tempered at 550° C. to obtain a working steel pipe, where the working steel pipe was made of stainless steel and its main components were as follows: 0.019% of C, 0.49% of Si, 1.25% of Mn, 0.022% of P, 0.00005% of S, 5.16% of Ni, 22.46% of Cr, 0.163% of N, 0.003% of Cu, 3.07% of Mo, and the balance Fe.

80 parts by weight of elastomer TPU was melted, 20 parts by weight of paraffin phase change microcapsules were added and evenly mixed and then a spiral ring elastomer was formed, and then the spiral ring elastomer was bonded on an outer wall of the working steel pipe by using 100 parts by weight of polyester to form a spiral ring supporting frame.

The outer wall of the working steel pipe was coated with an inorganic thermal insulation material, the inorganic thermal insulation material partially wrapped the spiral ring supporting frame, and an inorganic thermal insulation material layer was formed after curing, where part of the spiral ring supporting frame was wrapped in the inorganic thermal insulation material layer, and part of the spiral ring supporting frame was exposed outside the inorganic thermal insulation material layer, where the inorganic thermal insulation material layer included 20 parts by weight of nano alumina ceramic microspheres with a particle diameter of 100-200 nm, 10 parts by weight of hollow glass microspheres with a particle diameter of 100-200 nm, 15 parts by weight of paraffin phase change microcapsules, 8 parts by weight of reinforced fibers, 80 parts by weight of polyester and 15 parts by weight of water glass.

A steel plate used for an outer sleeve steel pipe was cleaned in an ultrasonic cleaning tank three times in turn by sodium dodecyl benzene sulfonate and clear water, air-dried and then curled, and the working steel pipe with the outer wall provided with the spiral ring supporting frame and the inorganic thermal insulation material layer was wrapped on an inner side of the steel plate in the curling process; after the wrapping, the steel plate was welded and sealed into a sleeve by laser welding, where an annular cavity between the inorganic thermal insulation material layer and an inner wall of the outer sleeve steel pipe had a thickness of 7 mm; and the sleeve obtained by welding was heated at 700° C. for 20 min, cooled in a hydrogen atmosphere, and tempered at 550° C. to obtain a working steel pipe, where the working steel pipe was made of TA18 titanium alloy and its main components were as follows: 3.5% of Al, 2.0% of V, 0.25% of Fe, 0.05% of C, 0.05% of N, 0.015% of H, 0.12% of O, and the balance Ti.

A plurality of rubber rings were placed at tightened ports of the outer sleeve steel pipe of the sleeve for sealing, the annular cavity was vacuumized to form an annular vacuum cavity, and finally the ports of the outer sleeve steel pipe were welded and sealed.

The obtained sleeve was subjected to heat treatment; specifically, heat treatment was performed at 100° C. for 60 min, then the sleeve was air-cooled to room temperature, and finally the sleeve was coated with an anti-corrosive liquid to form an anti-corrosive layer with a thickness of 0.1 mm, so that a 3000-meter-long thermally insulated pipeline was obtained. The anti-corrosive liquid included 55 parts by weight of silicone oil, 25 parts by weight of zinc powder, 2 parts by weight of citric acid, 7 parts by weight of epoxy resin, 3 parts by weight of alumina, 3 parts by weight of diatomite and 8 parts by weight of polyacrylamide.

A capsule core of the paraffin phase change microcapsules was made of paraffin, and a capsule wall was made of a polymer of methyl methacrylate and styrene at a molar ratio of 3:1.

Embodiment 3

This embodiment is different from Embodiment 1 in that a thermally insulated pipeline which was 5000 meters long was prepared, and a spiral ring supporting frame mainly included 30 parts by weight of paraffin phase change microcapsules, 80 parts by weight of elastomer TPU and 80 parts by weight of binder polyester.

A capsule core of the paraffin phase change microcapsules was made of paraffin, and a capsule wall was made of a polymer of methyl methacrylate and styrene at a molar ratio of 5:1.

Embodiment 4

This embodiment is different from Embodiment 3 in that the outer wall of the working steel pipe was further coated with an inorganic thermal insulation material, the inorganic thermal insulation material partially wrapped the spiral ring supporting frame, and an inorganic thermal insulation material layer was formed after curing, where part of the spiral ring supporting frame was wrapped in the inorganic thermal insulation material layer, and part of the spiral ring supporting frame was exposed outside the inorganic thermal insulation material layer, where the inorganic thermal insulation material layer included 25 parts by weight of nano alumina ceramic microspheres with a particle diameter of 200-400 nm, 15 parts by weight of hollow glass microspheres with a particle diameter of 100-200 nm, 10 parts by weight of paraffin phase change microcapsules, 8 parts by weight of reinforced fibers, 60 parts by weight of binder polyester and 15 parts by weight of water glass.

Embodiment 5

This embodiment is different from Embodiment 1 in that a thermally insulated pipeline which was 8000 meters long was prepared, and a spiral ring supporting frame mainly included 25 parts by weight of paraffin phase change microcapsules, 100 parts by weight of elastomer TPU and 80 parts by weight of binder polyester.

A capsule core of the paraffin phase change microcapsules was made of paraffin, and a capsule wall was made of a polymer of methyl methacrylate and styrene at a molar ratio of 4:1.

Embodiment 6

This embodiment is different from Embodiment 5 in that the outer wall of the working steel pipe was further coated with an inorganic thermal insulation material, the inorganic thermal insulation material partially wrapped the spiral ring supporting frame, and an inorganic thermal insulation material layer was formed after curing, where part of the spiral ring supporting frame was wrapped in the inorganic thermal insulation material layer, and part of the spiral ring supporting frame was exposed outside the inorganic thermal insulation material layer, where the inorganic thermal insulation material layer included 35 parts by weight of nano alumina ceramic microspheres with a particle diameter of 200-400 nm, 20 parts by weight of hollow glass microspheres with a particle diameter of 100-200 nm, 10 parts by weight of paraffin phase change microcapsules, 8 parts by weight of reinforced fibers, 60 parts by weight of binder polyester and 12 parts by weight of water glass.

Comparative Example 1

An 8000 meter thermally insulated pipeline was prepared according to the method disclosed in Embodiment 4 of CN109578752A.

Comparative Example 2

A thermally insulated pipeline which was 8000 meters long was prepared by using the method of Embodiment 5. The difference was that a spiral ring supporting frame mainly included 125 parts by weight of elastomer TPU and 80 parts by weight of binder polyester.

Comparative Example 3

A thermally insulated pipeline which was 8000 meters long was prepared by using the method of Embodiment 5. The difference was that a spiral ring supporting frame mainly included 25 parts by weight of paraffin phase change microcapsules, 100 parts by weight of elastomer TPU and 80 parts by weight of binder polyester.

A capsule core of the paraffin phase change microcapsules was made of paraffin, and a capsule wall was made of polymethyl methacrylate.

Comparative Example 4

A thermally insulated pipeline which was 8000 meters long was prepared by using the method of Embodiment 5. The difference was that a spiral ring supporting frame mainly included 25 parts by weight of paraffin phase change microcapsules, 100 parts by weight of elastomer TPU and 80 parts by weight of binder polyester.

A capsule core of the paraffin phase change microcapsules was made of paraffin, and a capsule wall was made of polystyrene.

The thermally insulated pipelines provided in Embodiments 1 to 5 and Comparative Examples 1 to 4 were used to respectively simulate underground working environments to exploit heat sources. Temperatures of extracted water were set to 250° C., 200° C. and 150° C., respectively. The thermally insulated pipelines prepared in Embodiments 1 to 2 were used to extract water of 150° C. The external environment of the pipelines simulated the temperature from underground 3000 meters to the earth's surface (the pipelines were set to go into the underground 3000 meters deep to extract water of 150° C.). The pipelines were subjected to stepped heating until the tops of the pipelines were at room temperature. Similarly, the thermally insulated pipelines prepared in Embodiments 3 to 4 were used to extract water of 200° C., and the thermally insulated pipelines prepared in Embodiment 5 to 6 and Comparative Examples 1 to 4 were used to extract water of 250° C., with a flow rate of 1.72 $m^3$/h. The simulation was performed five times continuously. The results are shown in Table 1.

TABLE 1

Test results of temperatures of water extracted from thermally insulated pipeline prepared by embodiments of the present invention and comparative examples

| | Embodiment 1 | Embodiment 2 | Embodiment 3 | Embodiment 4 | Embodiment 5 | Embodiment 6 | Comparative Example 1 | Comparative Example 2 | Comparative Example 3 | Comparative Example 4 |
|---|---|---|---|---|---|---|---|---|---|---|
| Temperature (° C.) of water extracted for the first time | 144 | 146 | 195 | 197 | 243 | 247 | 198 | 201 | 218 | 215 |
| Temperature (° C.) of water extracted for the second time | 146 | 148 | 197 | 198 | 245 | 248 | 202 | 206 | 223 | 221 |
| Temperature (° C.) of water extracted for the third time | 147 | 148 | 197 | 198 | 246 | 248 | 208 | 211 | 232 | 225 |
| Temperature (° C.) of water extracted for the fourth time | 147 | 148 | 198 | 198 | 248 | 249 | 215 | 218 | 237 | 231 |
| Temperature (° C.) of water extracted for the fifth time | 149 | 150 | 199 | 200 | 249 | 249 | 218 | 221 | 241 | 236 |

As can be seen from Table 1, the thermal insulation effect of the thermally insulated pipeline provided by the present invention is better.

At the same time, after simulating for five times, the thermally insulated pipeline was tested, and no obvious mechanical deformation was found in the working steel pipe and the outer sleeve steel pipe.

The foregoing descriptions are only preferred embodiments of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. An ultra-long thermally insulated pipeline, comprising a working steel pipe and an outer sleeve steel pipe sleeving the working steel pipe, wherein an annular vacuum cavity is formed between the working steel pipe and the outer sleeve steel pipe; two ends of the outer sleeve steel pipe are tightened; and the two ends of the outer sleeve steel pipe are sealed with an outer wall of the working steel pipe through a plurality of sealing rings; wherein the ultra-long thermally insulated pipeline further comprises:
   a spiral-ring-shaped supporting frame which is disposed outside the working steel pipe and is in contact with a wall of the working steel pipe, the spiral-ring-shaped supporting frame is made of a phase change material, and the phase change material comprises:
   20-30 parts by weight of paraffin phase change microcapsules, wherein a capsule core of the paraffin phase change microcapsules is made of paraffin, a capsule wall is made of a polymer of methyl methacrylate and styrene, and a molar ratio of the methyl methacrylate to the styrene is (3-5):1;
   50-100 parts by weight of elastomer; and
   50-100 parts by weight of binder.

2. The ultra-long thermally insulated pipeline according to claim 1, further comprising an inorganic thermal insulation material layer disposed outside the working steel pipe, wherein the inorganic thermal insulation material layer is compounded with the spiral-ring shaped supporting frame.

3. The ultra-long thermally insulated pipeline according to claim 2, further comprising an anti-corrosive layer disposed on an outer wall of the outer sleeve steel pipe.

4. The ultra-long thermally insulated pipeline according to claim 3, wherein the inorganic thermal insulation material layer comprises:
   20-40 parts by weight of nano alumina ceramic microspheres;
   10-20 parts by weight of hollow glass microspheres;
   10-20 parts by weight of paraffin phase change microcapsules, wherein a capsule core of the paraffin phase change microcapsules is made of paraffin, a capsule wall is made of a polymer of methyl methacrylate and styrene, and a molar ratio of the methyl methacrylate to the styrene is (3-5):1;
   5-10 parts by weight of reinforced fibers;
   50-80 parts by weight of binder; and
   10-20 parts by weight of water glass.

5. The ultra-long thermally insulated pipeline according to claim 3, wherein the annular vacuum cavity has a thickness of 3-10 mm; and the thermally insulated pipeline has a length of 1000-8000 m.

6. The ultra-long thermally insulated pipeline according to claim 3, further comprising a glass fiber aluminum foil layer disposed between the inorganic thermal insulation material layer and the outer sleeve steel pipe.

7. The ultra-long thermally insulated pipeline according to claim 2, wherein the inorganic thermal insulation material layer comprises:
   20-40 parts by weight of nano alumina ceramic microspheres;
   10-20 parts by weight of hollow glass microspheres;
   10-20 parts by weight of paraffin phase change microcapsules, wherein a capsule core of the paraffin phase change microcapsules is made of paraffin, a capsule wall is made of a polymer of methyl methacrylate and styrene, and a molar ratio of the methyl methacrylate to the styrene is (3-5):1;
   5-10 parts by weight of reinforced fibers;
   50-80 parts by weight of binder; and
   10-20 parts by weight of water glass.

8. The ultra-long thermally insulated pipeline according to claim 2, wherein the annular vacuum cavity has a thickness of 3-10 mm; and the thermally insulated pipeline has a length of 1000-8000 m.

9. The ultra-long thermally insulated pipeline according to claim 2, further comprising a glass fiber aluminum foil layer disposed between the inorganic thermal insulation material layer and the outer sleeve steel pipe.

10. The ultra-long thermally insulated pipeline according to claim 1, further comprising an anti-corrosive layer disposed on an outer wall of the outer sleeve steel pipe.

11. The ultra-long thermally insulated pipeline according to claim 10, wherein the inorganic thermal insulation material layer comprises:
- 20-40 parts by weight of nano alumina ceramic microspheres;
- 10-20 parts by weight of hollow glass microspheres;
- 10-20 parts by weight of paraffin phase change microcapsules, wherein a capsule core of the paraffin phase change microcapsules is made of paraffin, a capsule wall is made of a polymer of methyl methacrylate and styrene, and a molar ratio of the methyl methacrylate to the styrene is (3-5):1;
- 5-10 parts by weight of reinforced fibers;
- 50-80 parts by weight of binder; and
- 10-20 parts by weight of water glass.

12. The ultra-long thermally insulated pipeline according to claim 10, wherein the annular vacuum cavity has a thickness of 3-10 mm; and the thermally insulated pipeline has a length of 1000-8000 m.

13. The ultra-long thermally insulated pipeline according to claim 10, further comprising a glass fiber aluminum foil layer disposed between the inorganic thermal insulation material layer and the outer sleeve steel pipe.

14. The ultra-long thermally insulated pipeline according to claim 1, wherein the inorganic thermal insulation material layer comprises:
- 20-40 parts by weight of nano alumina ceramic microspheres;
- 10-20 parts by weight of hollow glass microspheres;
- 10-20 parts by weight of paraffin phase change microcapsules, wherein a capsule core of the paraffin phase change microcapsules is made of paraffin, a capsule wall is made of a polymer of methyl methacrylate and styrene, and a molar ratio of the methyl methacrylate to the styrene is (3-5):1;
- 5-10 parts by weight of reinforced fibers;
- 50-80 parts by weight of binder; and
- 10-20 parts by weight of water glass.

15. The ultra-long thermally insulated pipeline according to claim 1, wherein the annular vacuum cavity has a thickness of 3-10 mm; and the thermally insulated pipeline has a length of 1000-8000 m.

16. A forming method of an ultra-long thermally insulated pipeline, comprising the following steps:
   a): curling and welding a steel plate used for a working steel pipe into a pipe, and performing heat treatment to obtain a working steel pipe;
   b): making a phase change material into a spiral-ring shaped supporting frame on an outer wall of the working steel pipe, wherein the phase change material comprises:
   - 20-30 parts by weight of paraffin phase change microcapsules, wherein a capsule core of the paraffin phase change microcapsules is made of paraffin, a capsule wall is made of a polymer of methyl methacrylate and styrene, and a molar ratio of the methyl methacrylate to the styrene is (3-5):1;
   - 50-100 parts by weight of elastomer; and
   - 50-100 parts by weight of binder;
   c) curling a steel plate used for an outer sleeve steel pipe; wrapping, on an inner side of the steel plate, the working steel pipe with the outer wall provided with the spiral-ring-shaped supporting frame in the curling process, welding and sealing the working steel pipe into a sleeve with an annular cavity, and performing heat treatment on the sleeve;
   d): placing a plurality of rubber rings at two ends of the outer sleeve steel pipe for sealing, vacuumizing the annular cavity, and welding and sealing the ports of the outer sleeve steel pipe; and
   e): performing heat treatment on the welded and sealed pipeline.

17. The forming method according to claim 16, wherein after step b2), the method further comprises:
   b3): coating the outer wall of the working steel pipe with an inorganic thermal insulation material, and forming an inorganic thermal insulation material layer after curing, wherein the inorganic thermal insulation material comprises:
   - 20-40 parts by weight of nano alumina ceramic microspheres;
   - 10-20 parts by weight of hollow glass microspheres;
   - 10-20 parts by weight of paraffin phase change microcapsules, wherein a capsule core of the paraffin phase change microcapsules is made of paraffin, a capsule wall is made of a polymer of methyl methacrylate and styrene, and a molar ratio of the methyl methacrylate to the styrene is (3-5):1;
   - 5-10 parts by weight of reinforced fibers;
   - 50-80 parts by weight of binder; and
   - 10-20 parts by weight of water glass.

* * * * *